US012585432B2

(12) United States Patent
Kamoshida et al.

(10) Patent No.: US 12,585,432 B2
(45) Date of Patent: Mar. 24, 2026

(54) ARITHMETIC PROCESSING DEVICE AND ARITHMETIC METHOD

(71) Applicant: FUJITSU LIMITED, Kawasaki (JP)

(72) Inventors: Shiro Kamoshida, Kawasaki (JP);
Yuhei Takata, Kawasaki (JP);
Hiroyuki Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1081 days.

(21) Appl. No.: 17/667,586

(22) Filed: Feb. 9, 2022

(65) Prior Publication Data

US 2022/0357925 A1    Nov. 10, 2022

(30) Foreign Application Priority Data

May 10, 2021    (JP) ................................. 2021-079593

(51) Int. Cl.
| | |
|---|---|
| *G06F 7/57* | (2006.01) |
| *G06F 7/487* | (2006.01) |
| *G06F 7/498* | (2006.01) |

(52) U.S. Cl.
CPC ................ *G06F 7/57* (2013.01); *G06F 7/487* (2013.01); *G06F 7/4873* (2013.01); *G06F 7/4985* (2013.01); *G06F 7/4988* (2013.01)

(58) Field of Classification Search
CPC ...... G06F 7/487; G06F 7/4873; G06F 7/4876; G06F 7/4985; G06F 7/4986; G06F 7/4988
See application file for complete search history.

(56) References Cited

U.S. PATENT DOCUMENTS

| | | | | |
|---|---|---|---|---|
| 5,128,891 A | * | 7/1992 | Lynch ................... | G06F 7/5375 |
| | | | | 708/605 |
| 5,377,134 A | * | 12/1994 | Faget ..................... | G06F 7/535 |
| | | | | 708/650 |

(Continued)

FOREIGN PATENT DOCUMENTS

| | | | |
|---|---|---|---|
| JP | 2000-298576 A | 10/2000 | |
| JP | 2011-118633 A | 6/2011 | |
| WO | WO-2015156660 A1 * | 10/2015 | ........... G06F 7/4873 |

OTHER PUBLICATIONS

D. L. Harris, S. F. Oberman and M. A. Horowitz, "SRT division architectures and implementations," Proceedings 13th IEEE Sympsoium on Computer Arithmetic, Asilomar, CA, USA, 1997, pp. 18-25 (Year: 1997).*

*Primary Examiner* — Emily E Larocque
*Assistant Examiner* — Jerome Anthony Klosterman, II
(74) *Attorney, Agent, or Firm* — Fujitsu Intellectual Property Center

(57) ABSTRACT

An arithmetic processing device includes: a first multiplier circuit configured to calculate a product DY of an approximate value D obtained by approximating a reciprocal 1/Y of a divisor Y; a dividend operation circuit configured to compare a dividend X and the divisor Y, and generate an operation value twice the dividend X or the operation value equal to the dividend X based on a comparison result; a second multiplier circuit configured to calculate a product of the approximate value D and the operation value as an initial value R(0) of a partial remainder R(n); a third multiplier circuit configured to calculate a product DY*q(n) of the product DY and a partial quotient q(n) that is a predetermined number of upper bits of the partial remainder R(n); and a first addition circuit configured to calculate a new partial remainder R(n) by subtracting the product DY*q(n) from the partial remainder R(n).

7 Claims, 12 Drawing Sheets

(56) References Cited

U.S. PATENT DOCUMENTS

| | | | | |
|---|---|---|---|---|
| 7,346,642 B1 * | 3/2008 | Briggs | .................... | G06F 1/02 |
| | | | | 708/500 |
| 2006/0294177 A1 * | 12/2006 | Rubanovich | ........... | G06F 7/535 |
| | | | | 708/650 |
| 2009/0164543 A1 * | 6/2009 | Gopal | .................. | G06F 7/4873 |
| | | | | 708/502 |
| 2011/0131262 A1 | 6/2011 | Nakazato | | |

* cited by examiner

Figure 2:
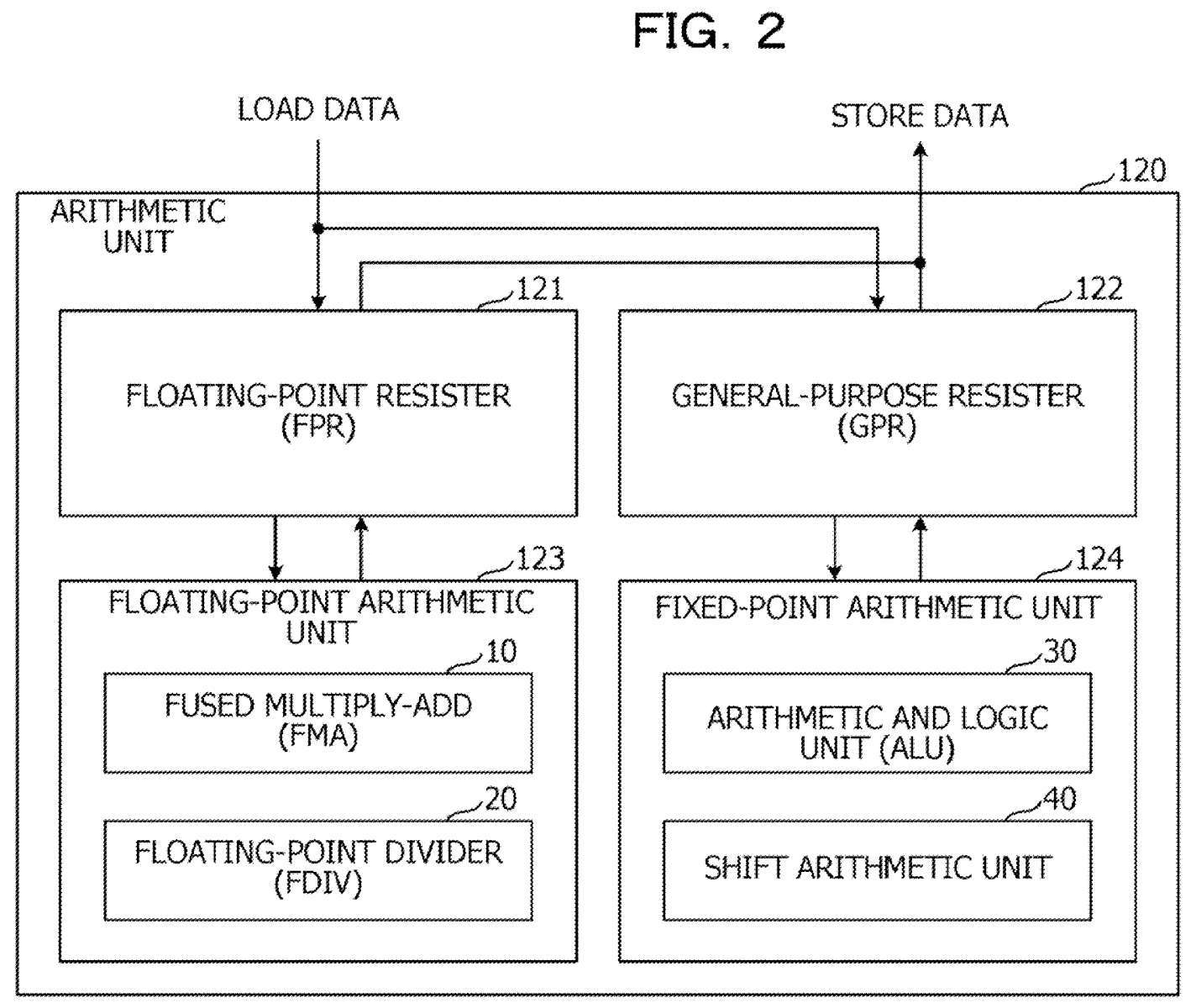

ARITHMETIC UNIT — 120

LOAD DATA

STORE DATA

FLOATING-POINT RESISTER (FPR) — 121

GENERAL-PURPOSE RESISTER (GPR) — 122

FLOATING-POINT ARITHMETIC UNIT — 123

FUSED MULTIPLY-ADD (FMA) — 10

FLOATING-POINT DIVIDER (FDIV) — 20

FIXED-POINT ARITHMETIC UNIT — 124

ARITHMETIC AND LOGIC UNIT (ALU) — 30

SHIFT ARITHMETIC UNIT — 40

FIG. 11

ARITHMETIC PROCESSING DEVICE AND ARITHMETIC METHOD

CROSS-REFERENCE TO RELATED APPLICATION

This application is based upon and claims the benefit of priority of the prior Japanese Patent Application No. 2021-79593, filed on May 10, 2021, the entire contents of which are incorporated herein by reference.

FIELD

The embodiments discussed herein are related to an arithmetic processing device and an arithmetic method.

BACKGROUND

In a floating-point divider installed in an arithmetic processing device, when finding a quotient of a mantissa part, a method of sequentially calculating a partial remainder and a partial quotient by repeating subtraction shift processing using a recurrence formula is known. In this type of floating-point divider, the calculation speed becomes higher by calculating the partial quotient of a plurality of bits by one-time subtraction shift processing than a case of calculating a quotient bit by bit.

Japanese Laid-open Patent Publication No. 2011-118633, Japanese Laid-open Patent Publication No. 2000-298576, and U.S. Patent Application Publication No. 2006/0294177 are disclosed as related art.

SUMMARY

According to an aspect of the embodiments, an arithmetic processing device includes: a table configured to retain an approximate value D obtained by approximating a reciprocal $1/Y$ of a divisor Y for the each divisor Y in a predetermined range; a first multiplier circuit configured to calculate a product DY of the approximate value D that is output from the table and corresponds to the divisor Y and the divisor Y; a dividend operation circuit configured to compare magnitude of a dividend X and magnitude of the divisor Y, and generate an operation value twice the dividend X in a case where the dividend X is smaller than the divisor Y, and generates the operation value equal to the dividend X in a case where the dividend X is equal to or larger than the divisor Y; a second multiplier circuit configured to calculate a product of the approximate value D and the operation value as an initial value R(0) of a partial remainder R(n); a retaining circuit configured to retain the partial remainder R(n); a third multiplier circuit configured to calculate a product $DY*q(n)$ of the product DY and a partial quotient q(n) that is a predetermined number of upper bits of the partial remainder R(n) retained in the retaining circuit; a first addition circuit configured to calculate a new partial remainder R(n) by subtracting the product $DY*q(n)$ from the partial remainder R(n) retained in the retaining circuit and left-shifting a predetermined number of bits, and store the calculated new partial remainder R(n) in the retaining circuit; and a quotient generation circuit configured to arrange the partial quotient q(n) at a predetermined bit position of a quotient.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram illustrating an example of an arithmetic processing device according to an embodiment;

FIG. 2 is a block diagram illustrating an example of an arithmetic unit of FIG. 1;

FIG. 11 is a block diagram illustrating an example of a recurrence formula arithmetic unit of an arithmetic processing device according to another embodiment.

DESCRIPTION OF EMBODIMENTS

Figure 3:
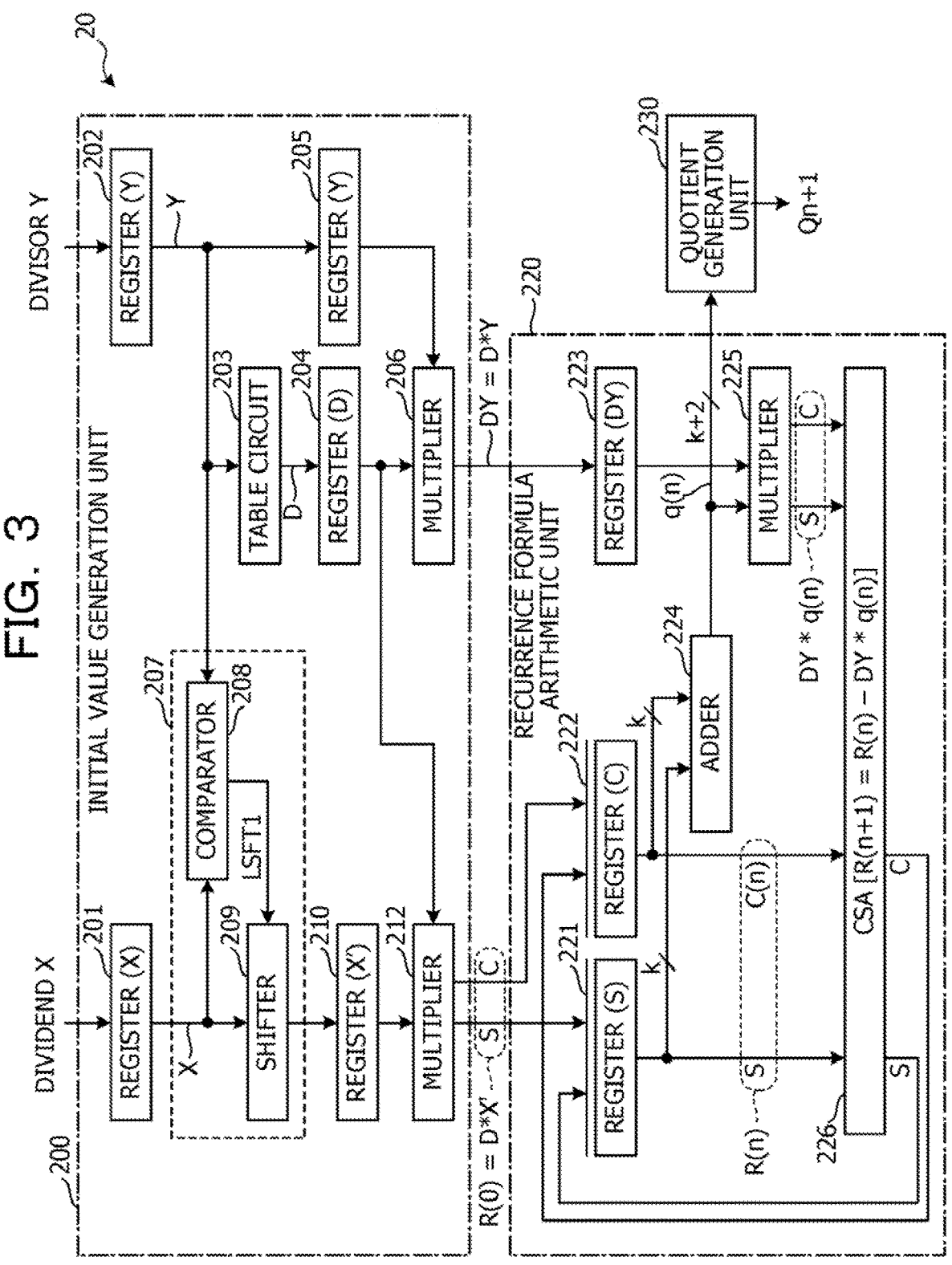
FIG. 3 is a block diagram illustrating an example of a floating-point divider of FIG. 2.

For example, in the existing subtraction shift processing method using the recurrence formula, the partial quotient that can be calculated by one-time subtraction shift processing has been about two bits due to a delay critical path of a circuit that executes the one-time subtraction shift processing.

In one aspect, the embodiment aims at executing division at a high speed by increasing the number of bits of the partial quotient to be calculated by one-time arithmetic processing by the recurrence formula by reducing the number of logic stages included in a critical path of a recurrence formula arithmetic unit.

Hereinafter, embodiments are described with reference to the drawings.

Figure 1:
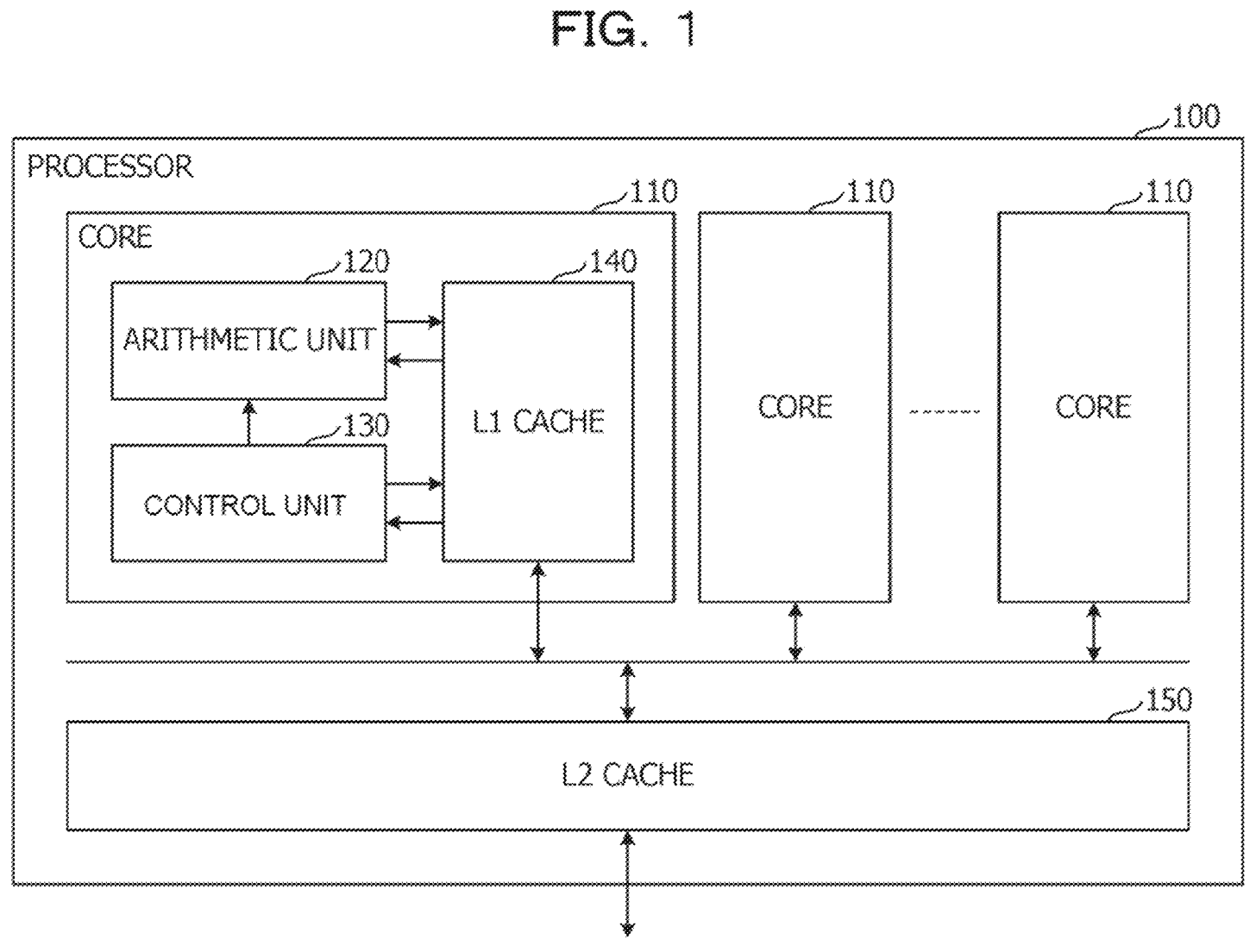

FIG. 1 illustrates an example of an arithmetic processing device according to an embodiment. A processor 100, which is an example of an arithmetic processing device illustrated in FIG. 1, has a plurality of cores 110 and an L2 cache 150. Each core 110 includes an arithmetic unit 120, a control unit 130, and an L1 cache 140.

The arithmetic unit 120 reads data from the L1 cache to a built-in register on the basis of a load instruction, and stores the data from the register to the L1 cache 140 on the basis of a store instruction. Furthermore, the arithmetic unit 120 executes an arithmetic operation using the data retained in the register on the basis of an arithmetic instruction, and stores an arithmetic result in the register. An example of the arithmetic unit 120 is illustrated in FIG. 2.

The control unit 130 includes, for example, an instruction fetch unit, an instruction buffer unit, an instruction decoding unit, a reservation station, and the like (not illustrated). The instruction fetch unit fetches an instruction from the L1 cache 140 and stores the fetched instruction in the instruction buffer unit. The instruction decoding unit sequentially decodes the instructions retained in the instruction buffer unit, and inputs the decoded instructions to the reservation station. The reservation station retains the instructions input from the instruction decoding unit and issues the instructions to the arithmetic unit 120 in order from an executable instruction.

In a case of retaining operand data requested by the arithmetic unit 120 or instruction data requested by the control unit 130 (cache hit), the L1 cache 140 outputs the retained data to the arithmetic unit 120 or the control unit 130. In a case of not retaining the operand data requested by the arithmetic unit 120 or the instruction data requested by the control unit 130 (cache miss), the L1 cache 140 issues an access request to the L2 cache. The L1 cache 140 retains data received from the L2 cache 150 and outputs the data to the arithmetic unit 120 or the control unit 130 as a request source.

In a case of retaining target data of the access request from the L1 cache 140 (cache hit), the L2 cache 150 outputs the retained data to the L1 cache 140. In a case of not retaining the target data of the access request from the L1 cache 140 (cache hit), the L2 cache 150 issues the access request to a main memory or a lower cache such as an L3 cache (not illustrated). Then, the L2 cache 150 retains the data received from the main memory or the lower cache, and outputs the data to the L1 cache 140.

Note that, although not particularly limited, in this embodiment, the processor 100 executes an arithmetic operation using double-precision floating-point number data. For example, the double-precision floating-point number format of the Institute of Electrical and Electronics Engineers (IEEE) 754 (floating-point number operation standard) is used, the sign is represented by 1 bit, the exponent is represented by 11 bits, and the mantissa is represented by 52 bits.

FIG. 2 illustrates an example of the arithmetic unit 120 of FIG. 1. The arithmetic unit 120 includes a floating-point register (FPR) 121, a general-purpose register (GPR) 122, a floating-point arithmetic unit 123, and a fixed-point arithmetic unit 124. Each of the floating-point register 121 and the general-purpose register 122 functions as a register file having a plurality of registers.

The floating-point register 121 retains the load data transferred from the L1 cache 140 as floating-point number data. The general-purpose register 122 retains the load data transferred from the L1 cache 140 as fixed-point number data. The floating-point register 121 and the general-purpose register 122 output the data retained in the register indicated by the store instruction as store data.

The floating-point arithmetic unit 123 includes a fused multiply-add (FMA) 10, a floating-point divider (FDIV) 20, and the like. The fixed-point arithmetic unit 124 includes an arithmetic and logic unit (ALU) 30, a shift arithmetic unit 40, and the like. An example of the floating-point divider 20 is illustrated in FIG. 3.

The fused multiply-add 10 and the floating-point divider 20 execute an arithmetic operation using the operand data retained in the floating-point register 121, and store an execution result in the floating-point register 121. The arithmetic and logic unit 30 and the shift arithmetic unit 40 execute an arithmetic operation using the operand data retained in the general-purpose register 122, and store an arithmetic result in the general-purpose register 122.

Figure 4:
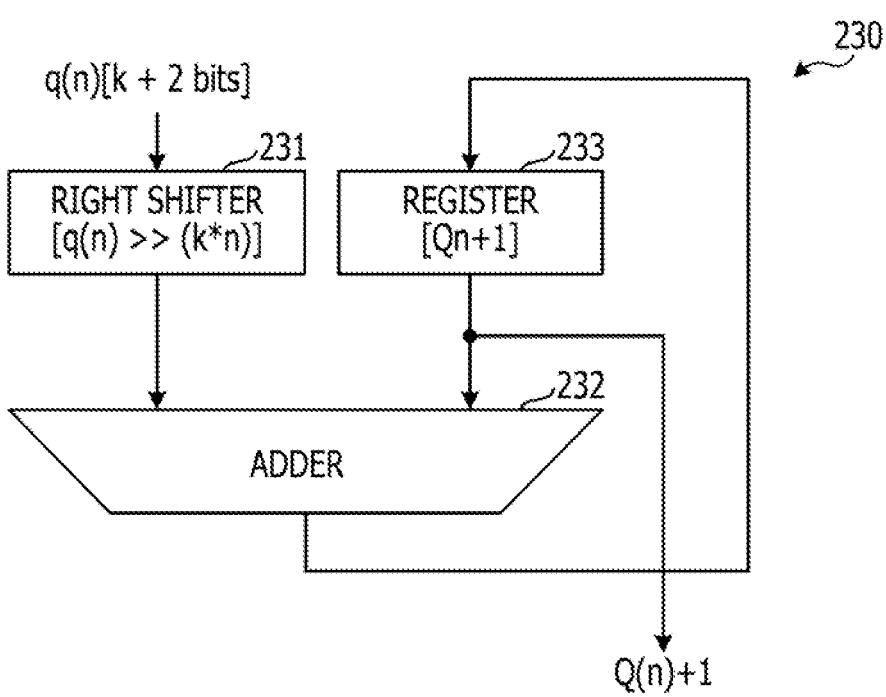
FIG. 4 is a circuit diagram illustrating an example of a quotient generation unit of FIG. 3.

FIG. 3 illustrates an example of the floating-point divider 20 of FIG. 2. Note that FIG. 3 illustrates a mantissa arithmetic unit that calculates a mantissa part of a dividend X and a divisor Y, and description of an exponential arithmetic unit is omitted. The floating-point divider 20 includes an initial value generation unit 200 that generates an initial value before iterative operation of a recurrence formula, a recurrence formula arithmetic unit 220 that executes arithmetic processing by the recurrence formula, and a quotient generation unit 230 that generates a quotient. An example of the quotient generation unit 230 is illustrated in FIG. 4.

The initial value generation unit 200 includes registers 201 and 202, a table circuit 203, registers 204 and 205, a multiplier 206, a dividend operation unit 207, a register 210, and a multiplier 212. The dividend operation unit 207 includes a comparator 208 and a shifter 209. The table circuit 203 is an example of a table. The multiplier 206 is an example of a first multiplier unit. The multiplier 212 is an example of a second multiplier unit.

The recurrence formula arithmetic unit 220 includes registers 221, 222, and 223, an adder 224, a multiplier 225, and a carry save adder (CSA) 226. The registers 221 and 222 are examples of retaining units. The multiplier 225 is an example of a third multiplier unit. The CSA 226 is an example of a first addition unit.

The initial value generation unit 200 generates a value R(0)=DX' and a value DY as initial values, which are suitable for generating a multi-bit quotient for each arithmetic processing of the recurrence formula by the recurrence formula arithmetic unit 220, using the dividend X and the divisor Y. The value R(0)=DX' is an approximate value of a quotient X'/Y, and the value DY is a product of an approximate value D of a reciprocal 1/Y of the divisor Y and Y. The value X' is a value 2X obtained by left-shifting the dividend X by 1 bit in a case of X<Y, and is the dividend X in a case of X Y, as illustrated in the formula (1) described below. Hereinafter, the value X' is also referred to as an operation value.

Both X'/Y and DX'/DY converge to the same quotient by the recurrence formula described below, but DX'/DY can constitutes a circuit with a faster convergence speed than X'/Y. Hereinafter, the approximate value of the reciprocal 1/Y of the divisor Y is referred to as the approximate value D.

In the initial value generation unit 200, the register 201 retains the dividend X (mantissa part), and the registers 202 and 205 sequentially retain the divisor Y (mantissa part). The dividend X and divisor Y input to the registers 201 and 202, respectively, are properly preprocessed with the mantissa parts in the floating-point format. For example, the dividend X is converted to a binary format that can be regarded as "1≤X<2", and the divisor Y is converted to a binary format that can be regarded as "1≤Y<2". For example, the dividend X and the divisor Y are 52 bits each. Note that, in the case where the floating-point divider 20 calculates single-precision floating-point number data, the dividend X and the divisor Y are 23 bits each.

The table circuit 203 retains the approximate value D obtained by approximating the reciprocal 1/Y of the divisor Y for each divisor Y in a predetermined range. Then, for example, the table circuit 203 outputs an i-bit approximate value D, using upper j bits of the divisor Y as an input, for example. Here, j and i are integers that are 2 or more and smaller than the number of bits of the divisor Y. Further-more, in the table circuit 203, the approximate value D of 1/Y is set to be smaller than 1/Y (D<1/Y) in order to make a partial quotient q(n), which is upper k bits of a partial remainder R(n) to be described below, 0 or more. Note that the number of bits represented by k can be increased as the approximate value D is closer to 1/Y (the higher the accu-racy) and the division can be executed at high speed but the size of the table circuit 203 increases accordingly.

A circuit area of the table circuit 203 and the depth of the number of logic stages change depending on how the values of j and i are taken, and the circuit area of the recurrence formula arithmetic unit 220, the depth of the number of logic stages, a quotient generation speed, and the like change. Here, the quotient generation speed depends on the number of bits k of the partial quotient q(n) obtained by one operation by the recurrence formula, and becomes higher as the number of bits k is larger. It is favorable that the values of j and i are appropriately set by comprehensively judging the circuit area allowed for the floating-point divider 20, an operating frequency of the core 110, a target division speed, and the like. Note that, to take advantage of the existing floating-point divider, j and i are appropriately determined within a range of "2≤j<the number of bits of Y" and "2≤i<the number of bits of Y".

The approximate value D output from the table circuit 203 is retained in the register 204 and then input to the multi-pliers 206 and 212. The multiplier 206 produces the product DY of the approximate value D and the divisor Y. Since the product DY is the product of the approximate value D of 1/Y and the divisor Y, the product DY is close to 1. The product DY is a constant that is always used during the iterative operation of the recurrence formula after retained in the register 223 of the recurrence formula arithmetic unit 220.

In the dividend operation unit 207, the comparator 208 compares the magnitude of the dividend X and the divisor Y. The comparator 208 outputs a shift signal LSFT1 when X<Y, and suppresses the output of the shift signal LSFT1 when X≥Y. When receiving the shift signal LSFT1, the shifter 209 executes a left-shift operation of the dividend X and generates an operation value X'.

The formula (1) represents the operation of the dividend operation unit 207 that generates the operation value X'.

$$X'=2X(\text{if } X<Y) \text{ or } X(\text{if } X≥Y) \qquad (1)$$

As described in the formula (1), the dividend operation unit 207 outputs 2X obtained by left-shifting the dividend X by 1 bit as the operation value X' when X<Y, and outputs the dividend X as the operation value X' when X Y. The operation of the dividend operation unit 207 is executed to determine the most significant bit of the quotient to "1" in the arithmetic processing by the recurrence formula arith-metic unit 220.

The register 210 retains the operation value X'. The multiplier 212 produces a product D*X' of the operation value X' and the approximate value D. The sign * represents a multiplication sign. The product D*X' is stored in the registers 221 and 222 separately for sum S and carry C, respectively, as the initial value R(0) of the recurrence formula for calculating the partial remainder R(n).

Note that, in FIG. 3, to operate the multiplier 212 at high speed, the multiplication result is output separately for the sum S and the carry C, but a fully-added multiplication result may also be output from the multiplier 212. In this case, as an initial value, the fully-added result is stored in one of the registers 221 and 222, and "0" is stored in the other of the registers 221 and 222.

In the recurrence formula arithmetic unit 220, the adder 224 adds the upper k bits of the sum S of the product D*X' retained in the register 221 and the upper k bits of the carry C of the product D*X' retained in the register 222, and outputs an addition result as a partial quotient q(n) of k+2 bits. The partial quotient q(n) is output to the multiplier 225 and the quotient generation unit 230. The partial quotient q(n) corresponds to a value obtained by extracting the upper k bits of the partial remainder R(n).

The multiplier 225 multiplies the partial quotient q(n) from the adder 224 and the value DY retained in the register 223 and outputs the product as a value DY*q(n). The CSA 226 subtracts the value DY*q(n) from the partial remainder R(n) retained in the registers 221 and 222, and outputs the sum S and carry C as a subtraction result.

The sum S and carry C as the subtraction result are left-shifted by k bits and stored in the registers 221 and 222 as new partial remainders R(n), respectively. The sum S and carry C respectively stored in the registers 221 and 222 are used as inputs for the arithmetic processing of the following recurrence formula. Note that it can be mathematically proved that all the k-bit data that is shifted out and discarded by left-shift of the k bits becomes "0". Therefore, even in the case of left-shifting the k bits of the partial remainder R(n+1) output from the CSA 226, occurrence of cancellation of significant digits in the partial remainder R(n+1) can be prevented.

Note that "k" is a fixed value in the floating-point divider 20. Therefore, the left-shift of the k bits is implemented by connecting output wiring of each bit of the sum S and carry C of the CSA 226 to inputs shifted by k bits of the registers 221 and 222. Thereby, the shifter that executes the left-shift of the k bits can be unneeded. Note that the left-shift of the k bits may also be executed by the shifter.

"k" is the number of bits of the quotient obtained by the arithmetic operation of one cycle by the recurrence formula, and an upper limit of "k" is determined by the precision of the approximate value D of 1/Y. The larger "k" is, the faster the quotient of division is calculated, but the circuit area becomes large and the number of stages of transistor in one cycle becomes large. For example, when the precision of the approximate value D is doubled (=1 bit added), "k" is increased by "1", but the area of the table circuit 203 is almost doubled, and the areas of the multipliers 206 and 212 and the adder 224 and multiplier 225 are almost (1+1/k) times larger, and the number of logic stages increases.

The formula (2) represents the recurrence formula for calculating the partial remainder R(n+1).

$$R(n+1)=m(R(n)-DY*q(n)) \qquad (2)$$

The sign m is a constant represented by 2^k. The sign "^" represents a power.

In this embodiment, the approximate value D (D<1/Y) of 1/Y generated by the table circuit 203 is input to the multipliers 206 and 212, and the initial value R(0) and the value DY of the partial remainder are calculated. Thereby, the partial quotient q(n), which is the upper k bits of the partial remainder R(n+1) and the partial remainder R(n), can always be set to 0 or more. Furthermore, by using the upper k bits of the partial remainder R(n) as they are as the partial quotient q(n), the partial remainder R(n+1) calculated by the CSA 226 can be always positive.

In the recurrence formula of the partial remainder R(n+1) illustrated in the formula (2), the delay critical path is the path of the adder 224 and the multiplier 225 used to calculate DY*q(n). Since the partial remainder R(n+1) is always positive, the adder 224 and the multiplier 225 included in the delay critical path can be made simple logic, and the number of logic stages can be minimized. Thereby, in a case where an execution cycle time of the recurrence formula of the formula (2) is not changed, the number of bits k of the quotient obtained by one operation by the recurrence formula can be increased, and the division by the floating-point divider 20 may be executed at a high speed.

FIG. 4 illustrates an example of the quotient generation unit 230 of FIG. 3. A right shifter 231, an adder 232, and a register 233 are included. The right shifter 231 can adjust the partial quotient q(n) to a predetermined bit position of the quotient by right-shifting the partial quotient q(n) of k+2 bits output from the adder 224 of the recurrence formula arithmetic unit 220 in FIG. 2 by "k*n" bits.

The adder 232 adds an output value of the right shifter 231 and an output value of the register 233, and stores an addition result in the register 233 as the quotient Qn+1. Note that the initial value Q(0) of the quotient retained in the register 233 is set to "0". The quotient Qn+1 retained in the register 233 is output to the outside of the floating-point divider 20.

The formula (3) represents the recurrence formula for calculating the quotient Q(n+1).

$$Q(n+1)=Q(n)+q(n)/(m\hat{\ }n) \qquad (3)$$

In the formula (3), the sign m is a constant represented by $2\hat{\ }k$, as in the formula (2), so $q(n)/(m\hat{\ }n)$ represents right-shift of q(n) by k*n bits.

Figure 5:
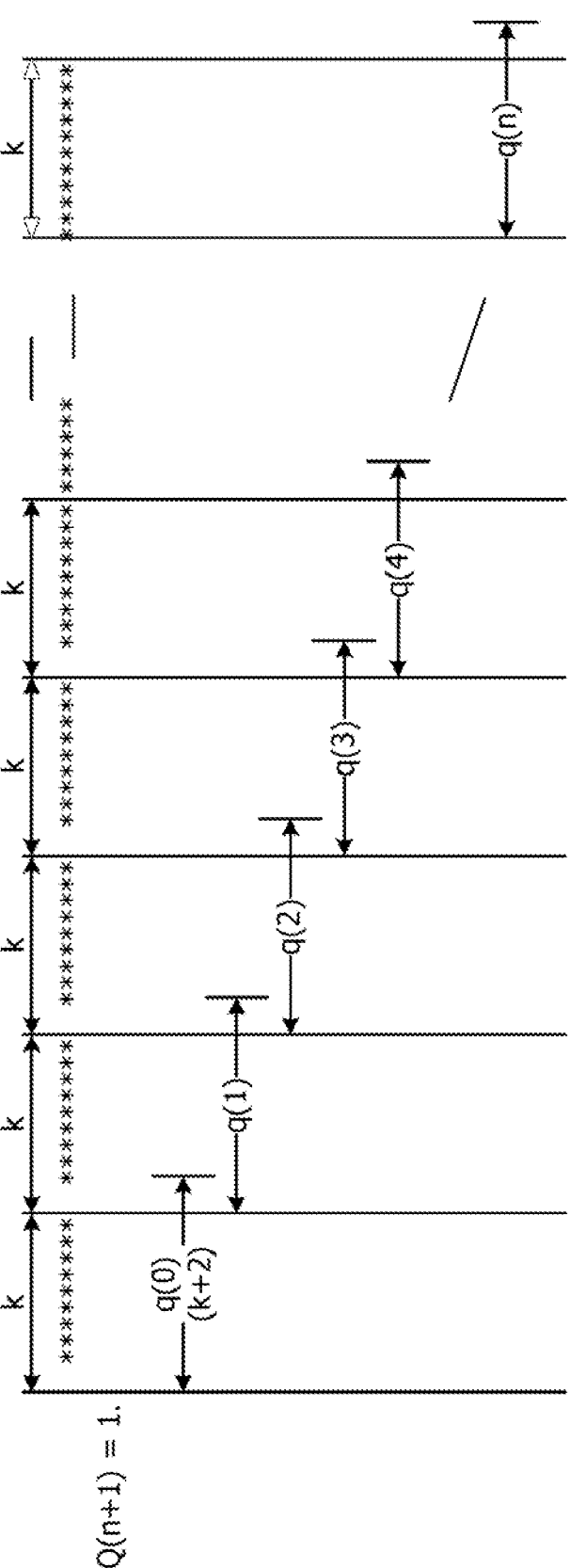
FIG. 5 is an explanatory diagram illustrating an example in which a partial quotient q(n) is right-bit shifted by the quotient generation unit of FIG. 3 and aligned with a bit position of a quotient Q(n+1)

FIG. 5 illustrates an example in which the partial quotient q(n) is right-bit shifted by the quotient generation unit 230 of FIG. 3 and aligned with the bit position of the quotient Q(n+1). The partial quotient q(n) is right-shifted by k*n bits by executing the arithmetic processing of the recurrence formula of the quotient Q(n+1) illustrated in the formula (3), and is arranged at a predetermined bit position of the quotient Q(n+1).

Here, the carry C input to the adder 224 in FIG. 3 is shifted to the left by 1 bit with respect to the sum S. Furthermore, in a case where carry over occurs by the addition result of the sum S and carry C, one bit is further increased. Therefore, the partial quotient q(n), which is the addition result of the adder 224, can be k+2 bits at the maximum. Therefore, as illustrated in FIG. 5, the quotient generation unit 230 overlaps the partial quotient q(n) by 2 bits and adds them. As a result, the partial quotient q(n) can be shifted by k bits and arranged at the correct position of the quotient Q(n+1).

Figure 6:
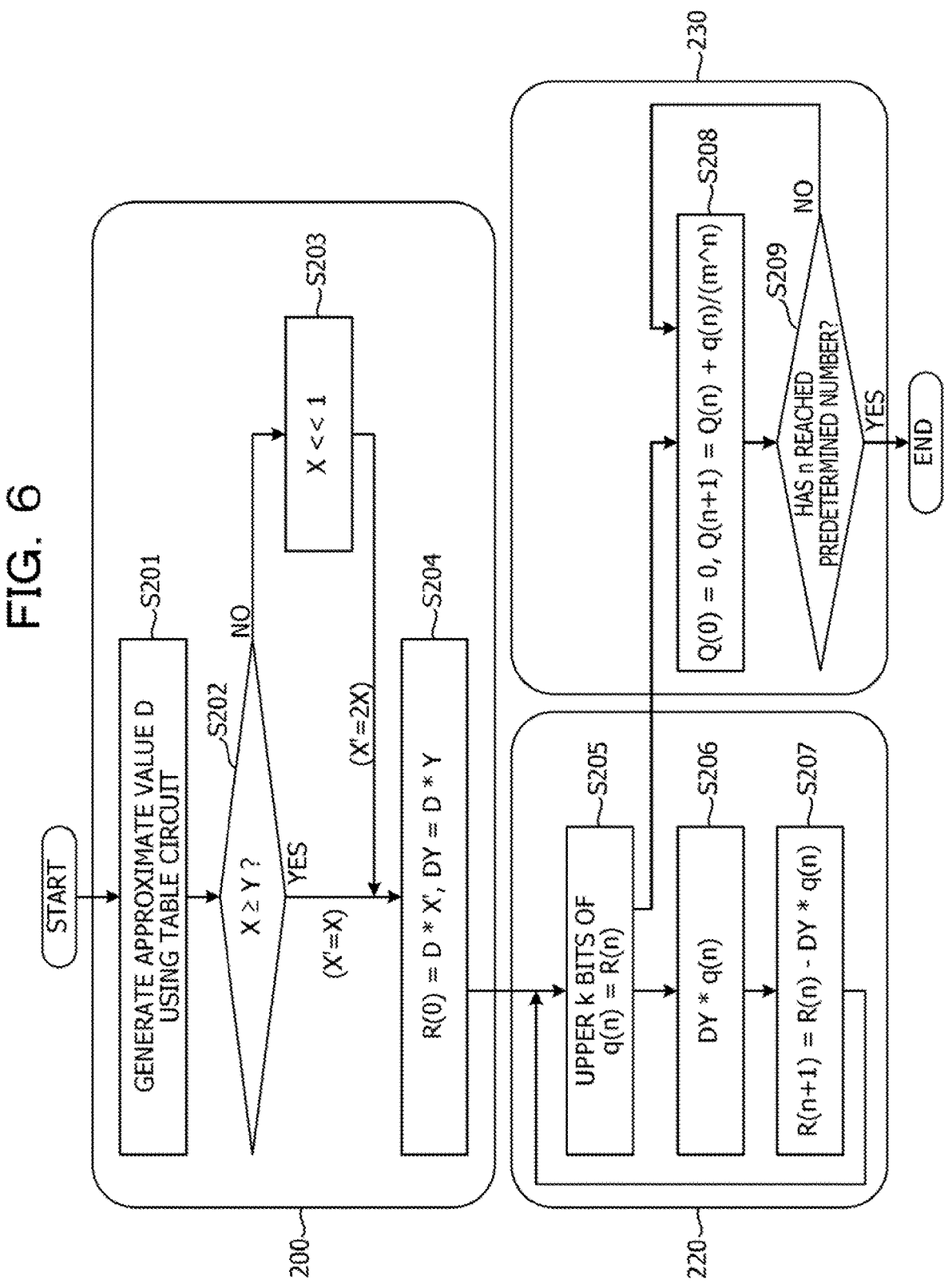
FIG. 6 is a flowchart illustrating an example of an operation of the floating-point divider of FIG. 3.

FIG. 6 illustrates an example of an operation of the floating-point divider 20 of FIG. 3. For example, FIG. 6 illustrates an example of an arithmetic method by the processor 100 as an arithmetic processing device. The flow illustrated in FIG. 6 is executed every time the dividend X and the divisor Y are supplied to the floating-point divider 20. Steps S201 to S204 illustrate an example of the operation of the initial value generation unit 200 in FIG. 3. Steps S205 to S207 illustrate an example of the operation of the recurrence formula arithmetic unit 220 in FIG. 3. Steps S208 to S209 illustrate an example of the operation of the quotient generation unit 230 in FIG. 3.

In step S201, the initial value generation unit 200 gives the divisor Y to the table circuit 203 and generates the approximate value D of the reciprocal 1/Y of the divisor Y. Next, in step S202, the initial value generation unit 200 compares the magnitude of the dividend X and the divisor Y by the comparator 208. When the dividend X is the divisor Y or more, the initial value generation unit 200 executes step S204 with the dividend X as the operation value X'. The initial value generation unit 200 executes step S203 when the dividend X is smaller than the divisor Y.

In step S203, the initial value generation unit 200 left-shifts the dividend X by 1 bit by the shifter 209, thereby executing step S204 with the value twice the dividend X as the operation value X'.

In step S204, the initial value generation unit 200 generates the initial value R(0) of the recurrence formula by multiplying the approximate value D and the operation value X' by the multiplier 212. The initial value generation unit 200 generates the value DY by multiplying the approximate value D and the divisor Y by the multiplier 206. The initial value generation unit 200 outputs the generated initial value R(0) and the generated value DY to the recurrence formula arithmetic unit 220.

In step S205, the recurrence formula arithmetic unit 220 outputs the upper k bits of the partial remainder R(n) (the sum S and carry C of the value D*X') retained in the registers 221 and 222 by the adder 224 as the partial quotient q(n).

After step S205, in step S206, the recurrence formula arithmetic unit 220 multiplies the partial quotient q(n) from the adder 224 by the value DY retained in the register 223 by the multiplier 225 to calculate the value DY*q(n). Next, in step S207, the recurrence formula arithmetic unit 220 subtracts the value DY*q(n) from the partial remainder R(n) retained in the registers 221 and 222 by the CSA 226, thereby executing the operation of the recurrence formula illustrated in the formula (2). Then, the recurrence formula arithmetic unit 220 calculates the partial remainder R(n+1), stores the sum S and carry C of the calculated new partial remainder R(n+1) in the registers 221 and 222, respectively, and returns the operation to step S205.

Furthermore, after step S205, in step S208, the quotient generation unit 230 sets the initial value Q(0) to "0" before executing the recurrence formula of the first time. Furthermore, the quotient generation unit 230 right-shifts the partial quotient q(n) by "k*n" bits by the right shifter 231 and the adder 232 in FIG. 4, and adds the shift result with the previous quotient Qn retained in the register 233, thereby executing the operation of the recurrence formula illustrated in the formula (3). Right-shift by the "k*n" bits is equivalent to division of the partial quotient q(n) by "m$\hat{\ }$n". Then, the quotient generation unit 230 stores the calculated new quotient Q(n+1) in the register 233, and executes step S209.

In step 209, the quotient generation unit 230 completes the generation operation of the quotient Q(n+1) in the case where "n" has reached a predetermined number. In the case where "n" has not reached the predetermined number, the quotient generation unit 230 returns the operation for calculating the next quotient Q(n+1) to step S208. Note that the processing of steps S206 and S207 and the processing of steps S208 and S209 are executed in parallel to each other.

As described above, in this embodiment, the approximate value D of the reciprocal 1/Y of the divisor Y generated by the table circuit 203 is input to the multipliers 206 and 212, and the initial value R(0) and the value DY of the partial remainder are calculated. At this time, the table circuit 203 is configured to make the approximate value D smaller than the reciprocal, so that the partial quotient q(n) that is the upper k bits of the partial remainder R(n) can be always made 0 or more. Thereby, the number of logic stages of the adder 224 and the multiplier 225 included in the delay critical path can be minimized and the value DY*q(n) can be calculated. As a result, the number of bits k of the quotient obtained by one operation by the recurrence formula can be increased as compared with an existing case, and the division by the floating-point divider 20 may be executed at a high speed.

Figure 7:
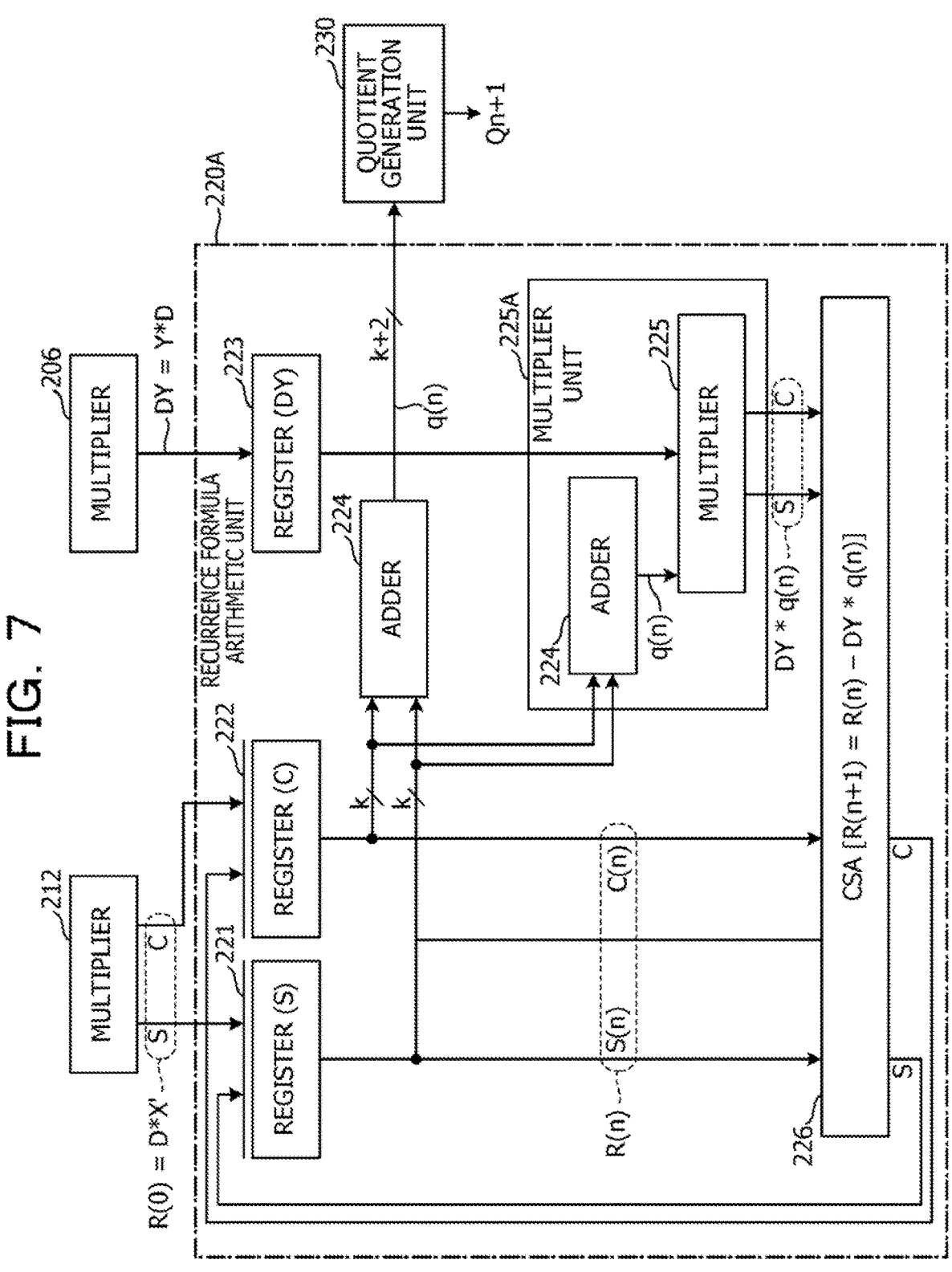
FIG. 7 is a block diagram illustrating an example of a recurrence formula arithmetic unit of an arithmetic processing device of another embodiment.

FIG. 7 illustrates an example of a recurrence formula arithmetic unit of an arithmetic processing device of another embodiment. Elements similar to those in FIG. 3 are denoted by the same reference signs, and detailed description is omitted. The configuration of a recurrence formula arithmetic unit 220A illustrated in FIG. 7 is similar to the configuration of the recurrence formula arithmetic unit 220 of FIG. 1 except that a multiplier unit 225A is provided instead of the multiplier 225. Other configurations of a floating-point divider 20 including the recurrence formula arithmetic unit 220A are similar to the configuration of the floating-point divider 20 in FIG. 3.

The arithmetic processing device of this embodiment is similar to the processor 100 of FIG. 1 and the arithmetic unit 120 of FIG. 2, except that the configuration of the floating-point divider 20 provided in an arithmetic unit 120 is different from that of FIG. 3. For example, the floating-point divider 20 of this embodiment has a recurrence formula arithmetic unit 220A, and an initial value generation unit 200 and a quotient generation unit 230 illustrated in FIG. 3.

The multiplier unit 225A of the recurrence formula arithmetic unit 220A includes an adder 224 and a multiplier 225. The multiplier unit 225A is an example of a third multiplier unit. The adder 224 is an example of a second addition unit. The configurations of the adder 224 and the multiplier 225 in FIG. 7 are similar to the configurations of the adder 224 and the multiplier 225 in FIG. 3. For example, the recurrence formula arithmetic unit 220A of this embodiment includes the adder 224 for calculating a partial quotient q(n) to be output to the quotient generation unit 230, and the adder 224 for calculating a partial quotient q(n) to be used to generate a value DY*q(n) to be output to a CSA 226.

The recurrence formula used to calculate a partial remainder R(n+1) by the recurrence formula arithmetic unit 220A is the same as the formula (2). The recurrence formula used to calculate a quotient Q(n+1) by the quotient generation unit 230 is the same as the formula (3).

As described above, even in this embodiment, the number of logic stages of the adder 224 and the multiplier 225 included in the delay critical path can be reduced as in the above-described embodiment. As a result, the number of bits k of the quotient obtained by one operation by the recurrence formula can be increased as compared with an existing case, and the division by the floating-point divider 20 may be executed at a high speed.

Figure 8:
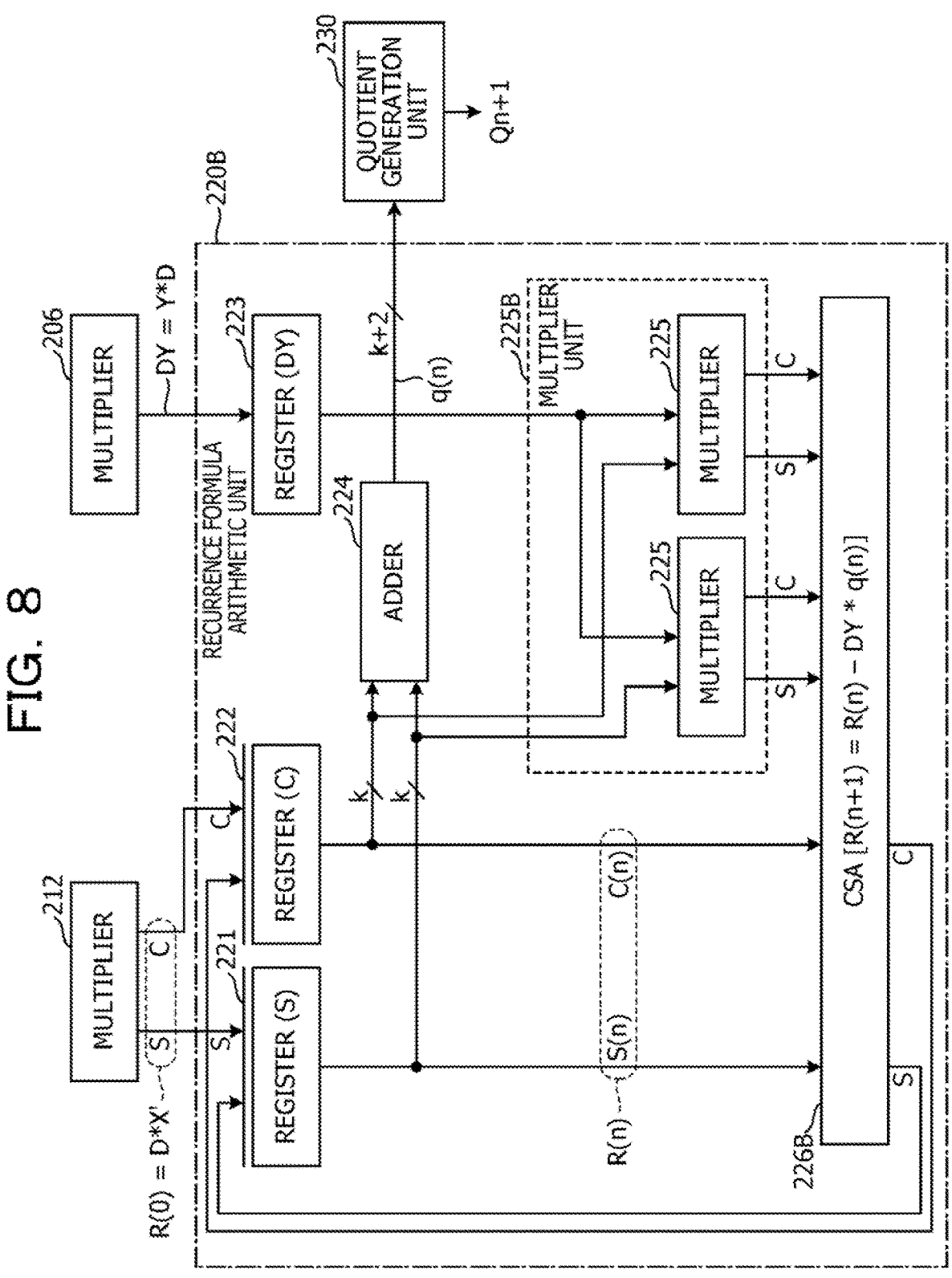
FIG. 8 is a block diagram illustrating an example of a recurrence formula arithmetic unit of an arithmetic processing device of another embodiment.

FIG. 8 illustrates an example of a recurrence formula arithmetic unit of an arithmetic processing device of another embodiment. Elements similar to those in FIGS. 3 and 7 are denoted by the same reference numerals, and detailed description is omitted. The configuration of a recurrence formula arithmetic unit 220B illustrated in FIG. 8 is similar to the configuration of the recurrence formula arithmetic unit 220A of FIG. 7 except that multiplier units 225B and a CSA 226B are provided instead of the multiplier units 225A and the CSA 226. Other configurations of a floating-point divider 20 including the recurrence formula arithmetic unit 220B are similar to the configuration of the floating-point divider 20 in FIG. 3.

The arithmetic processing device of this embodiment is similar to the processor 100 of FIG. 1 and the arithmetic unit 120 of FIG. 2, except that the configuration of the floating-point divider 20 provided in an arithmetic unit 120 is different from that of FIG. 3. For example, the floating-point divider 20 of this embodiment has the recurrence formula arithmetic unit 220B, and an initial value generation unit 200 and a quotient generation unit 230 illustrated in FIG. 3.

The multiplier unit 225B of the recurrence formula arithmetic unit 220B includes two multipliers 225. The multiplier unit 225B is an example of the third multiplier unit. The two multipliers 225 are examples of respective first and second multipliers.

One of the multipliers 225 multiplies upper k bits of sum S of a partial remainder R(n) retained in a register 221 with a value DY retained in a register 223, and outputs sum S and carry C of a multiplication result to the CSA 226. The other of the multipliers 225 multiplies upper k bits of carry C of a partial remainder R(n) retained in the register 222 with a value DY retained in the register 223, and outputs sum S and carry C of a multiplication result to the CSA 226. The sums S and carries C output from the two multipliers 225, respectively, correspond to a value DY*q(n).

The CSA 226B subtracts the value DY*q(n) indicated by the sums S and carries C output from the two multipliers 225, respectively, from the partial remainder R(n) retained in the registers 221 and 222, and outputs the sum S and carry C of a subtraction result. The sum S and carry C as the subtraction result are left-shifted by k bits and stored in the registers 221 and 222 as new partial remainders R(n), respectively.

The recurrence formula used to calculate a partial remainder R(n+1) by the recurrence formula arithmetic unit 220B is the same as the formula (2). The recurrence formula used to calculate a quotient Q(n+1) by the recurrence formula arithmetic unit 220B is the same as the formula (3). However, in this embodiment, an adder 224 is not included in a path (for example, a delay critical path) from the registers 221 and 222 to the multiplier 225. Therefore, the number of logic stages of the delay critical path corresponding to the recurrence formula of the partial remainder R(n+1) illustrated in the formula (2) can be reduced as compared with the above-described embodiment. As a result, the number of bits k of the quotient obtained by one operation by the recurrence formula can be further increased, and the division by the floating-point divider 20 may be executed at a higher speed.

As described above, in this embodiment, the number of bits k of the quotient obtained by one operation can be further increased and the division by the floating-point divider 20 may be executed at a higher speed, by removing the adder 224 from the delay critical path.

Figure 9:
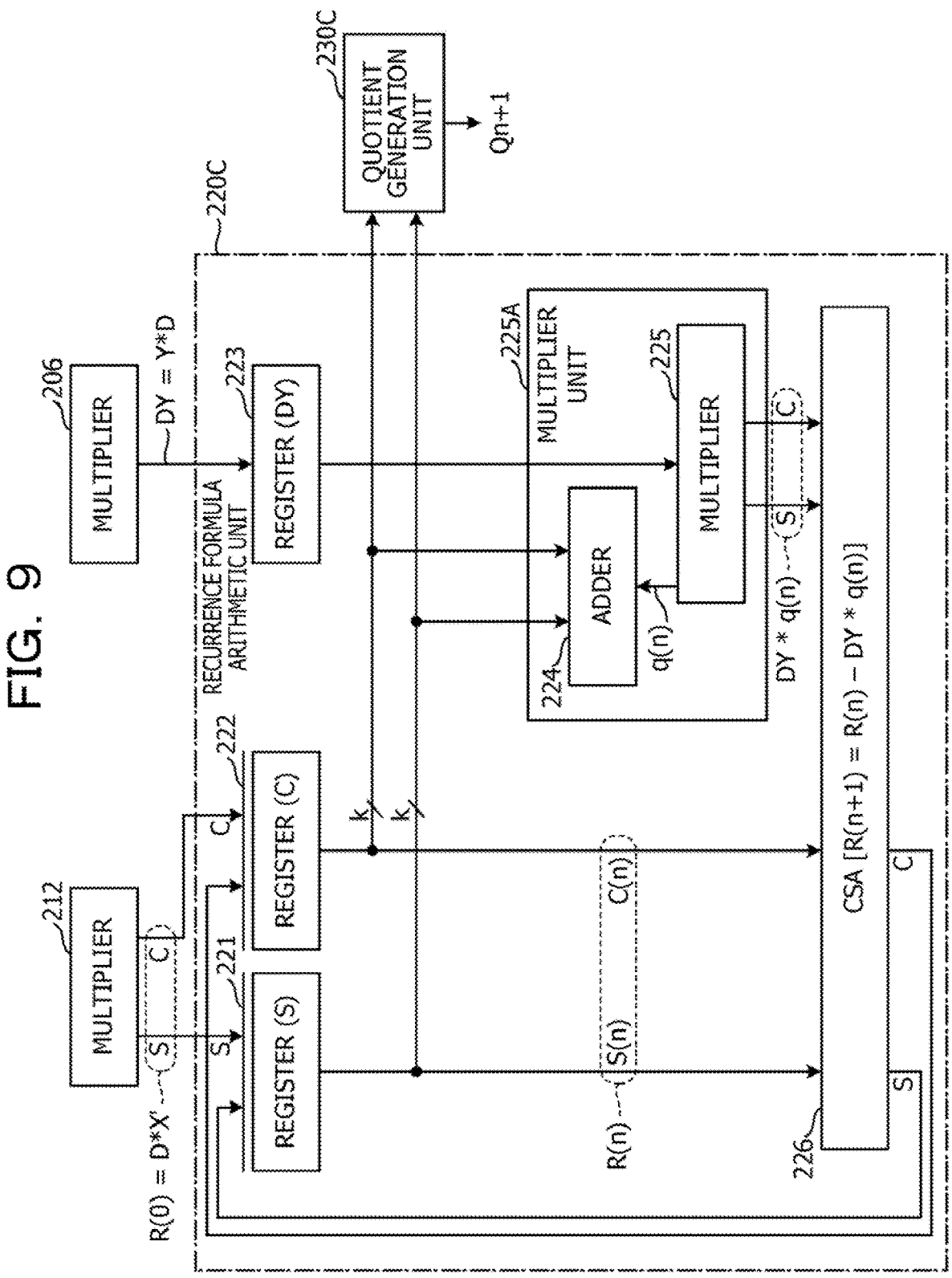
FIG. 9 is a block diagram illustrating an example of a recurrence formula arithmetic unit of an arithmetic processing device of another embodiment.

FIG. 9 illustrates an example of a recurrence formula arithmetic unit of an arithmetic processing device of another embodiment. Elements similar to those in FIGS. 3 and 7 are denoted by the same reference numerals, and detailed description is omitted. The configuration of a recurrence formula arithmetic unit 220C illustrated in FIG. 9 is similar to the configuration of the recurrence formula arithmetic unit 220A of FIG. 7 except that an adder 224 for calculating a partial quotient q(n) to be output to a quotient generation unit 230 is not provided. Other configurations of a floating-point divider 20 including the recurrence formula arithmetic unit 220C are similar to the configuration of the floating-point divider 20 in FIG. 3.

The arithmetic processing device of this embodiment is similar to the processor 100 of FIG. 1 and the arithmetic unit 120 of FIG. 2, except that the configuration of the floating-point divider 20 provided in an arithmetic unit 120 is different from that of FIG. 3. The floating-point divider 20 of this embodiment has the recurrence formula arithmetic unit 220C, and an initial value generation unit 200 and a quotient generation unit 230C illustrated in FIG. 3. The recurrence formula used to calculate a partial remainder R(n+1) by the recurrence formula arithmetic unit 220C is the same as the formula (2).

The quotient generation unit 230C directly receives upper k bits of sum S of the partial remainder R(n) retained by a register 221 and upper k bits of carry C of the partial remainder R(n) retained by a register 222. The recurrence formula used to calculate a quotient Q(n+1) by the quotient generation unit 230C is the same as the formula (3). An example of the quotient generation unit 230C is illustrated in FIG. 10.

Figure 10:
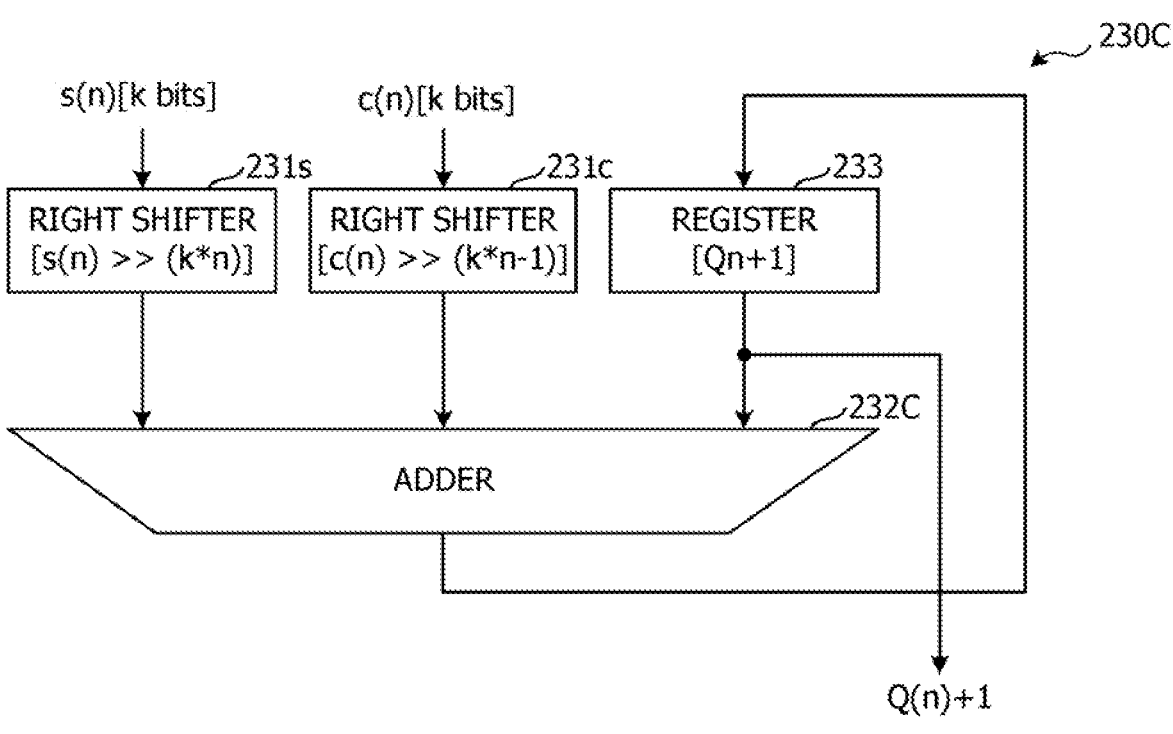
FIG. 10 is a circuit diagram illustrating an example of a quotient generation unit of FIG. 8.

FIG. 10 is a circuit diagram illustrating an example of the quotient generation unit 230C of FIG. 8. An element similar to the quotient generation unit 230 in FIG. 4 is denoted by the same reference numeral, and detailed description is omitted. The quotient generation unit 230C has two right shifters 231s and 231c, an adder 232C, and a register 233.

The right shifter 231s right-shifts the upper k bits of the sum S(n) of the partial remainder R(n) output from the recurrence formula arithmetic unit 220C in FIG. 9 by "k*n" bits, and outputs a shift result to the adder 232C. The right shifter 231c right-shifts the upper k bits of the carry C(n) of the partial remainder R(n) output from the recurrence formula arithmetic unit 220C in FIG. 9 by "k*n−1" bits, and outputs a shift result to the adder 232C. Since the carry C(n) is arranged one bit higher (left side) with respect to the sum S(n), the carry C(n) is set one bit less than the number of shifts of the sum S(n).

The adder 232C adds output values of the right shifters 231s and 231c and an output value of the register 233, and stores an addition result in the register 233 as the quotient Qn+1. Even in the quotient generation unit 230C, an initial value Q(0) retained in the register 233 is "0".

As described above, even in this embodiment, the number of logic stages of an adder 224 and a multiplier 225 included in a delay critical path can be reduced as in the above-described embodiment. As a result, the number of bits k of the quotient obtained by one operation by the recurrence formula can be increased, and the division by the floating-point divider 20 may be executed at a high speed.

Figure 11:
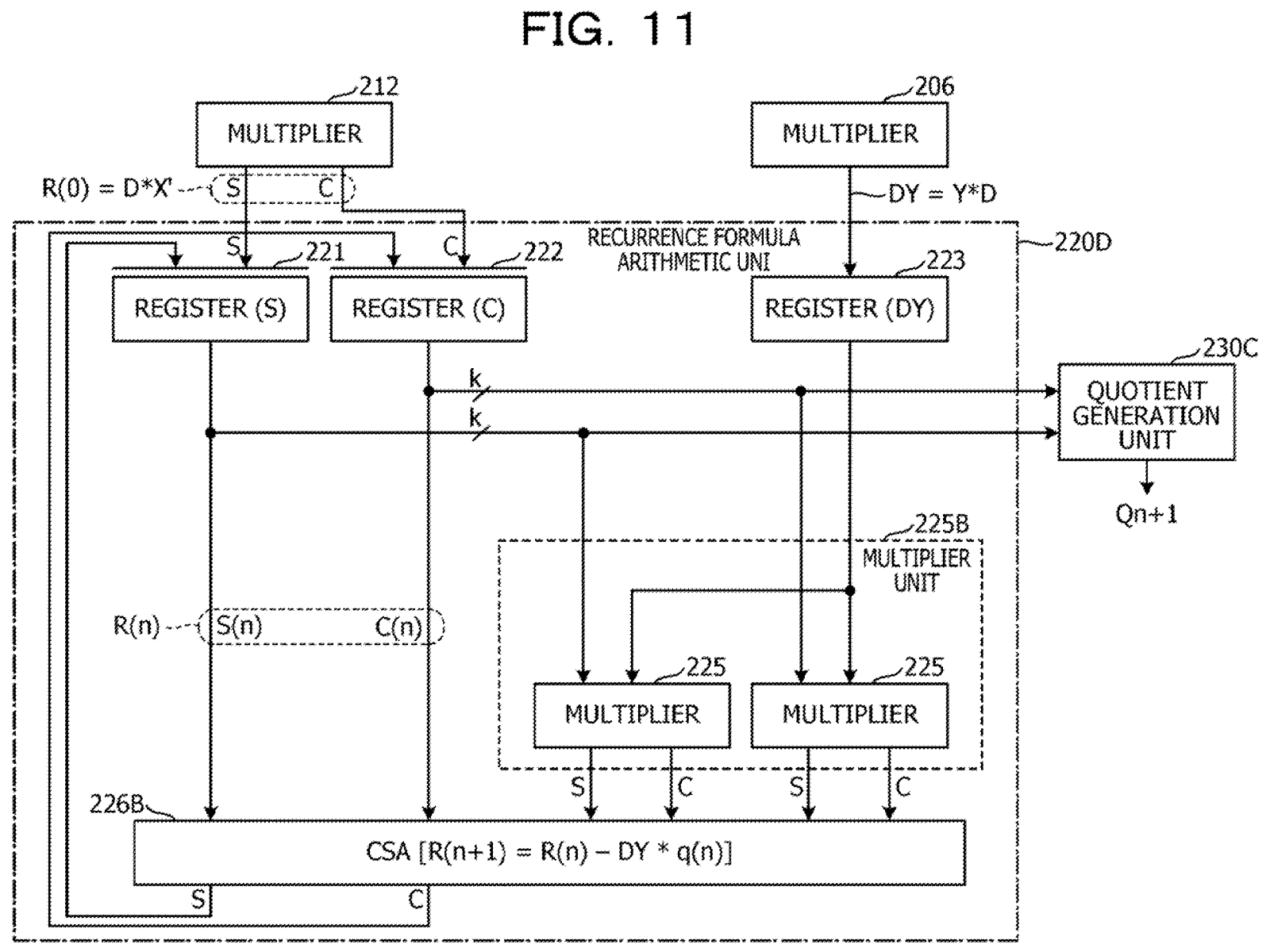

FIG. 11 illustrates an example of a recurrence formula arithmetic unit of an arithmetic processing device of another embodiment. Elements similar to those in FIGS. 3 and 8 are denoted by the same reference numerals, and detailed description is omitted. The configuration of a recurrence formula arithmetic unit 220D illustrated in FIG. 11 is similar to the configuration of the recurrence formula arithmetic unit 220B of FIG. 8 except that an adder 224 for calculating a partial quotient q(n) to be output to a quotient generation unit 230C is not provided. The configuration of a floating-point divider 20 including the recurrence formula arithmetic unit 220D is similar to the configuration of the floating-point divider 20 in FIG. 3.

The arithmetic processing device of this embodiment is similar to the processor 100 of FIG. 1 and the arithmetic unit 120 of FIG. 2, except that the configuration of the floating-point divider 20 provided in an arithmetic unit 120 is different from that of FIG. 3. The floating-point divider 20 of this embodiment has the recurrence formula arithmetic unit 220D, an initial value generation unit 200 illustrated in FIG. 3, and a quotient generation unit 230C illustrated in FIG. 10.

As described above, even in this embodiment, the number of logic stages of the adder 224 and the multiplier 225 included in the delay critical path can be reduced as in the above-described embodiment. As a result, the number of bits k of the quotient obtained by one operation by the recurrence formula can be increased, and the division by the floating-point divider 20 may be executed at a high speed.

Figure 12:
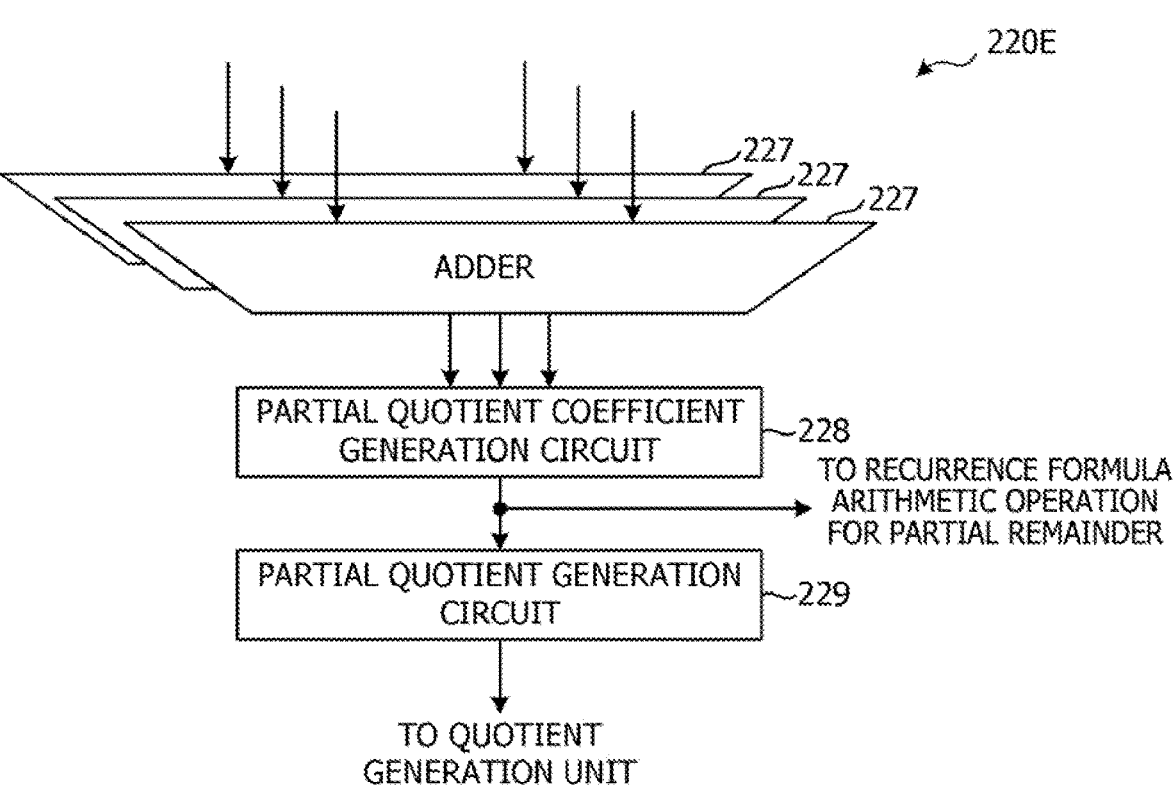
FIG. 12 is a block diagram illustrating an example of a recurrence formula arithmetic unit of a floating-point divider of another arithmetic processing device.

FIG. 12 illustrates an example of a recurrence formula arithmetic unit of a floating-point divider of another arithmetic processing device. A recurrence formula arithmetic unit 220E illustrated in FIG. 12 calculates a partial remainder R(n+1), using the recurrence formula illustrated in the formula (2). Furthermore, the recurrence formula arithmetic unit 220E calculates a partial quotient q(n) to be used in the recurrence formula described in the formula (3). FIG. 12 illustrates only elements included in a delay critical path in the recurrence formula arithmetic unit 220. The recurrence formula arithmetic unit 220E includes a plurality of adders 227, a partial quotient coefficient generation circuit 228, and a partial quotient generation circuit 229.

In a case where a table circuit 203 illustrated in FIG. 3 is not used and an approximate value D of a reciprocal 1/Y of a divisor Y (D<1/Y) is not used, the partial quotient q(n) is not necessarily 0 or more. In this case, as illustrated in FIG. 12, a circuit scale (for example, the number of logic stages) included in the delay critical path is increased as compared with the above-described embodiment. As a result, it becomes difficult to increase the number of bits k of the quotient obtained by one operation by the recurrence formula, and it becomes difficult to execute division by the floating-point divider at a high speed.

Note that the above-described embodiment has been described as an example of application to the floating-point divider 20. For example, the above-described embodiment can also be applied to a fixed-point divider by executing appropriate transformation such as aligning of most significant bits of a dividend X and a divisor Y.

From the detailed description above, characteristics and advantages of the embodiments will become apparent. This intends that claims cover the characteristics and advantages of the embodiment described above without departing from the spirit and the scope of the claims. Furthermore, one of ordinary knowledge in the corresponding technical field may easily achieve various improvements and modifications. Therefore, there is no intention to limit the scope of the inventive embodiments to those described above, and the scope of the inventive embodiment may rely on appropriate improvements and equivalents included in the scope disclosed in the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a table configured to retain an approximate value D obtained by approximating a reciprocal 1/Y of a divisor Y for the each divisor Y in a predetermined range;
a first multiplier circuit configured to calculate a product DY of the approximate value D that is output from the table and corresponds to the divisor Y and the divisor Y;
a dividend operation circuit configured to compare magnitude of a dividend X and magnitude of the divisor Y, and generate an operation value twice the dividend X in a case where the dividend X is smaller than the divisor Y, and generates the operation value equal to the dividend X in a case where the dividend X is equal to or larger than the divisor Y;

a second multiplier circuit configured to calculate a product of the approximate value D and the operation value as an initial value R(0) of a partial remainder R(n) where n denotes an iteration index indicating a current iteration number in a recursive calculation based on a recurrence formula;

a retaining circuit configured to retain the partial remainder R(n);

a third multiplier circuit configured to calculate a product DY*q(n) of the product DY and a partial quotient q(n) that is a value represented by upper k-bits of the partial remainder R(n) retained in the retaining circuit where k denotes a fixed value determined by a precision of the approximate value D;

a first addition circuit configured to calculate a new partial remainder R(n+1) by subtracting the product DY*q(n) from the partial remainder R(n) retained in the retaining circuit and left-shifting a predetermined number of bits, and store the calculated new partial remainder R(n+1) in the retaining circuit; and a quotient generation circuit configured to arrange the partial quotient q(n) at a predetermined bit position of a quotient.

2. The arithmetic processing device according to claim 1, wherein the table retains the approximate value D smaller than the reciprocal 1/Y.

3. The arithmetic processing device according to claim 1, wherein the retaining circuit retains sum and carry as the partial remainder R(n), and the third multiplier circuit receives the value represented by the upper k-bits of the sum and the carry retained in the retaining circuit as the partial quotient q(n).

4. The arithmetic processing device according to claim 3, wherein the third multiplier circuit includes a second addition circuit configured to add the value represented by the upper k-bits of the sum and the carry retained in the retaining circuit to calculate the partial quotient q(n), and a multiplier configured to output the product DY*q(n) of the partial quotient q(n) output by the second addition circuit and the product DY to the first addition circuit.

5. The arithmetic processing device according to claim 3, wherein the third multiplier circuit includes a fourth multiplier configured to output a product of the value represented by the upper k-bits of the sum retained in the retaining circuit and the product DY as sum and carry to the first addition circuit, and a fifth multiplier configured to output a product of the value represented by the upper k-bits of the carry retained in the retaining circuit and the product DY as sum and carry to the first addition circuit.

6. The arithmetic processing device according to claim 3, wherein the quotient generation circuit includes an adder that adds the value represented by the upper k-bits of the sum and the carry retained in the retaining circuit, and arranges an addition result of the adder at a predetermined bit position of a quotient as the partial quotient q(n).

7. An arithmetic processing method implemented by an arithmetic processing device, the arithmetic processing method comprising:

obtaining a table configured to retain an approximate value D obtained by approximating a reciprocal 1/Y of a divisor Y for the each divisor Y in a predetermined range;

calculating, by a first multiplier circuit of the arithmetic processing device, a product DY of the approximate value D that is output from the table and corresponds to the divisor Y and the divisor Y;

comparing, by a dividend operation circuit of the arithmetic processing device, magnitude of a dividend X and magnitude of the divisor Y, and generating an operation value twice the dividend X in a case where the dividend X is smaller than the divisor Y, and generating the operation value equal to the dividend X in a case where the dividend X is equal to or larger than the divisor Y;

calculating, a second multiplier circuit of the arithmetic processing device, a product of the approximate value D and the operation value as an initial value R(0) of a partial remainder R(n) where n denotes an iteration index indicating a current iteration number in a recursive calculation based on a recurrence formula;

retaining, by a retaining circuit of the arithmetic processing device, the partial remainder R(n) in a retaining circuit;

calculating, by a third multiplier circuit of the arithmetic processing device, a product DY*q(n) of the product DY and a partial quotient q(n) that is a value represented by upper k-bits of the partial remainder R(n) retained in the retaining circuit where k denotes a fixed value determined by a precision of the approximate value D;

calculating, by a first addition circuit of the arithmetic processing device, a new partial remainder R(n+1) by subtracting the product DY*q(n) from the partial remainder R(n) retained in the retaining circuit and left-shifting a predetermined number of bits, and store the calculated new partial remainder R(n+1) in the retaining circuit; and arranging, by a quotient generation circuit of the arithmetic processing device, the partial quotient q(n) at a predetermined bit position of a quotient.

* * * * *